(12) United States Patent
Wagner et al.

(10) Patent No.: US 10,414,427 B2
(45) Date of Patent: Sep. 17, 2019

(54) STEERING COLUMN AND BEARING ASSEMBLY

(71) Applicant: BRC Rubber & Plastics, Inc., Fort Wayne, IN (US)

(72) Inventors: Robert Wagner, Fort Wayne, IN (US); Gary Wellman, Auburn, IN (US)

(73) Assignee: BRC Rubber & Plastics Inc., Fort Wayne, IN (US)

( * ) Notice: Subject to any disclaimer, the term of this patent is extended or adjusted under 35 U.S.C. 154(b) by 111 days.

(21) Appl. No.: 15/678,953

(22) Filed: Aug. 16, 2017

(65) Prior Publication Data

US 2018/0050721 A1 Feb. 22, 2018

Related U.S. Application Data

(60) Provisional application No. 62/375,771, filed on Aug. 16, 2016.

(51) Int. Cl.

| B62D 1/16 | (2006.01) |
|---|---|
| F16C 27/06 | (2006.01) |
| B62D 1/19 | (2006.01) |
| B60G 7/00 | (2006.01) |

(52) U.S. Cl.
CPC ............. B62D 1/195 (2013.01); B60G 7/005 (2013.01); B62D 1/16 (2013.01); F16C 27/063 (2013.01); *F16C 2326/05* (2013.01); *F16C 2326/24* (2013.01)

(58) Field of Classification Search
CPC .......... B62D 1/195; B62D 1/16; B60G 7/005; F16C 27/063; F16C 2326/24; F16C 27/06; F16C 2326/05

USPC ....... 384/192, 477, 492, 498, 536, 203, 207, 384/209; 280/779; 277/399, 407, 506, 277/596
See application file for complete search history.

(56) References Cited

U.S. PATENT DOCUMENTS

| 2,258,040 | A | * | 10/1941 | Young | F16C 27/063 384/215 |
|---|---|---|---|---|---|
| 4,031,967 | A | * | 6/1977 | Atherton | E02F 3/764 172/795 |
| 4,185,880 | A | * | 1/1980 | Shiomi | B62D 1/16 384/498 |
| 4,553,760 | A | * | 11/1985 | Reed | F16C 11/0666 180/9.5 |
| 4,708,499 | A | * | 11/1987 | Loser | F16C 23/084 384/484 |
| 4,895,391 | A | * | 1/1990 | Groat | B62D 1/16 280/779 |
| 2007/0175696 | A1 | * | 8/2007 | Saito | B62D 1/16 180/444 |
| 2011/0293360 | A1 | * | 12/2011 | Becker | F16C 11/045 403/161 |

FOREIGN PATENT DOCUMENTS

DE 4036051 C1 * 4/1992 ............ B60G 7/00

* cited by examiner

*Primary Examiner* — Marcus Charles
(74) *Attorney, Agent, or Firm* — Barrett McNagny LLP

(57) ABSTRACT

A vibration-free, rotatable, sealed support for a steering intermediate shaft, adapted to accommodate slight irregularities in the outside diameter of the intermediate shaft, with reduced complexity and cost of manufacture, and improved reliability, compared to bearing and seal assemblies known to the art, comprising a mounting flange, a sealing member, and a monolithic bearing.

8 Claims, 5 Drawing Sheets

STEERING COLUMN AND BEARING ASSEMBLY

CROSS REFERENCE TO PRIOR APPLICATIONS

This nonprovisional application claims priority to, and incorporates in its entirety, provisional application Ser. No. 62/375,771, filed on Aug. 16, 2016.

STATEMENT OF GOVERNMENT FUNDING

N/A

BACKGROUND

Automotive vehicles typically employ an intermediate shaft, also known in the art as an I-shaft, between the steering column and steering gear for the purpose of transmitting rotational motion of the steering wheel to the steering gear. Such intermediate shafts are commonly connected with the steering gear and steering column by means of universal joints or other types of flexible joints. A bearing and seal assembly according to the present invention is intended to provide support to such an intermediate shaft, while sealing vehicle compartment against environmental contamination and noise at the point at which the intermediate shaft transverses the firewall or the vehicle front of dash panel.

The present bearing and seal assembly is intended to provide a vibration-free, rotatable, sealed support for a steering intermediate shaft, further adapted to accommodate slight irregularities in the outside diameter of the intermediate shaft, with reduced complexity and cost of manufacture, and improved reliability, compared to bearing and seal assemblies known to the art.

U.S. Pat. No. 4,895,391 discloses a combination bearing and seal assembly that claims to be capable of accommodating a shaft having a varying diameter. This patent, however, utilizes a needle bearing, which can result in customer dissatisfaction due to noise issues, is complex and expensive to manufacture compared to the present invention, and which also suffers reduced reliability compared to the present invention.

It is an object of the present invention to provide an automotive steering intermediate shaft bearing and seal assembly which not only supports an intermediate shaft but which also excludes environmental factors such as road noise and contamination from the passenger compartment and from the bearing assembly itself.

It is a further object of the present invention to provide an intermediate shaft bearing and seal assembly which will accommodate minor angular misalignments occurring between the intermediate shaft and the aperture through the front of dash panel or vehicle firewall in which the bearing is mounted.

It is yet a further object of the present invention to provide a steering intermediate shaft bearing and seal assembly which accommodates shafts having minor variations in their outer diameter.

It is yet a further advantage of the present invention to provide a monolithic bearing for such an intermediate shaft bearing and seal assembly that has reduced costs of manufacture and reduced complexity and improved reliability compared to bearings, and particularly needle bearings, known to the art for this application. Other objects, features and advantages of the present invention will become apparent to those skilled in the art upon reading this disclosure.

SUMMARY

In accordance with the present invention, an intermediate shaft bearing and seal assembly, which is suitable for use in an automotive steering system in conjunction with a steering column and a steering gear, comprises a monolithic bearing for accepting the intermediate shaft, such bearing being self-adjustably radially flexible to accommodate slight variations in the diameter of the intermediate shaft, a rotatable intermediate shaft seal member for excluding environmental contamination from entering the bearing, and a flange for securing the assembly to a vehicle front of dash panel or firewall. The bearing is mounted within a first cavity traversing the seal member, and the seal member is mounted in a sealed, partially rotatable connection with the flange.

The bearing is monolithic, comprised of a polymer or elastomer with high durability, physical resilience, and the ability to flex and return from flexion repeatedly without breaking. Suitable materials include, by way of example, nylon 66, polypropylene, polytetrafluoroethylene compounds such as Teflon®, or copolyesters such as Hytrel. The bearing further comprises a plurality of discontinuities disposed around its circumference, which enable the bearing to self-adjustingly flex to accommodate minor variations or irregularities in the diameter of an intermediate shaft.

The seal member is comprised of an elastomeric material, including preferably and by way of example, rubber. The seal member comprises a generally convex outer surface in the general configuration of an abbreviated sphere. The seal member further comprises a transverse first cavity adapted to accept the monolithic bearing. The seal member further comprises a first lip and second lip, both adapted to secure the seal member within the flange by interference fit while still allowing partial rotation of the seal member with respect to the flange.

The flange comprises a bracket with mounting holes adapted for mounting to the front of dash panel of an automotive vehicle, and further comprises a second channel adapted to fit cooperatively with the intermediate shaft aperture in a front of dash panel or firewall. The second channel comprises a contact surface about the inner face of its perimeter, which contact surface is adapted to engage the outer surface of the seal member such that the seal member is, once fitted into the second channel, retained by interference fit of the first lip and second lip. The seal member, once installed in the assembly, is partially rotatable within the flange.

DETAILED DESCRIPTION OF EMBODIMENT

Figure 1:
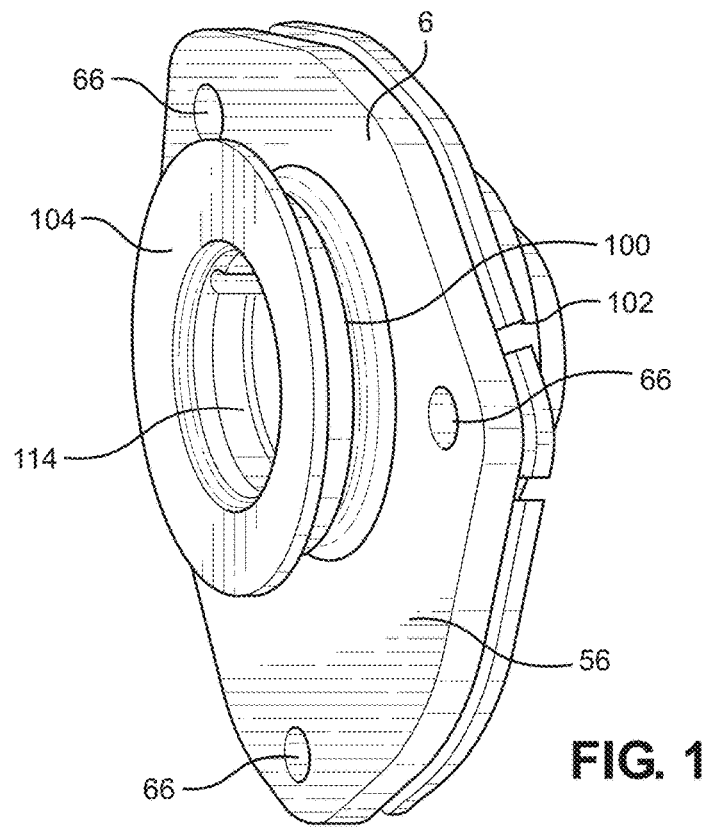
FIG. 1 shows a perspective view of a preferred embodiment of the present invention, side.
Figure 2:
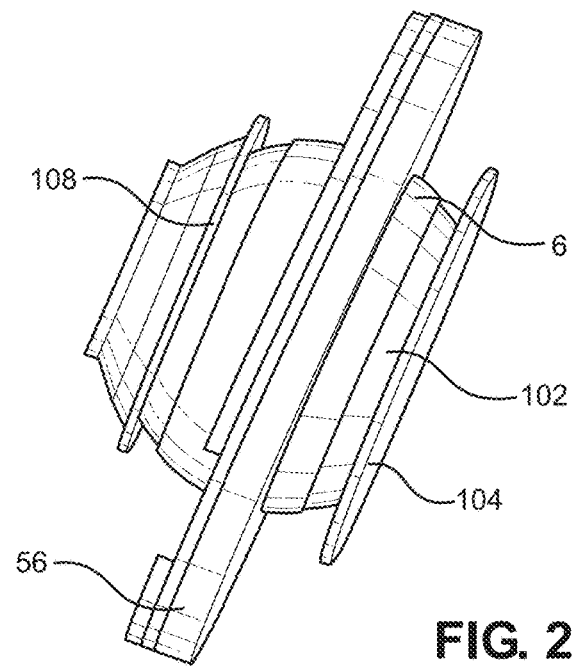
FIG. 2 shows a side view of an intermediate shaft seal assembly according to a preferred embodiment of the present invention.
Figure 3:
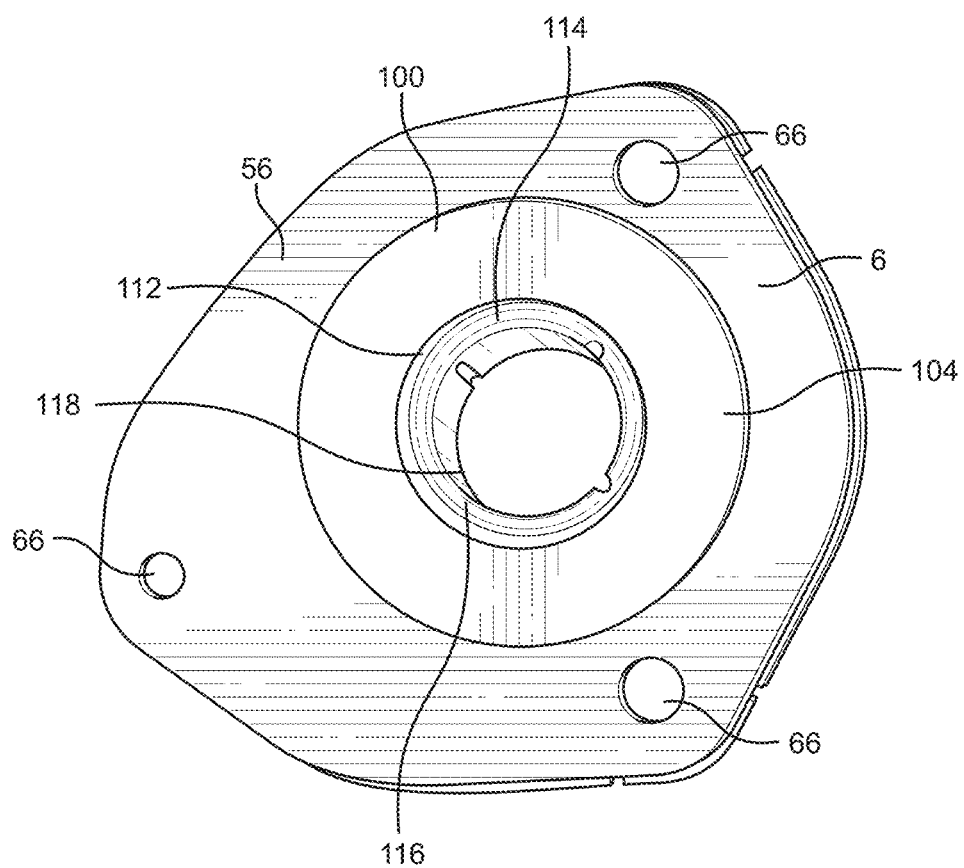
FIG. 3 shows a top view of an intermediate shaft seal assembly according to a preferred embodiment of the present invention.
Figure 4:
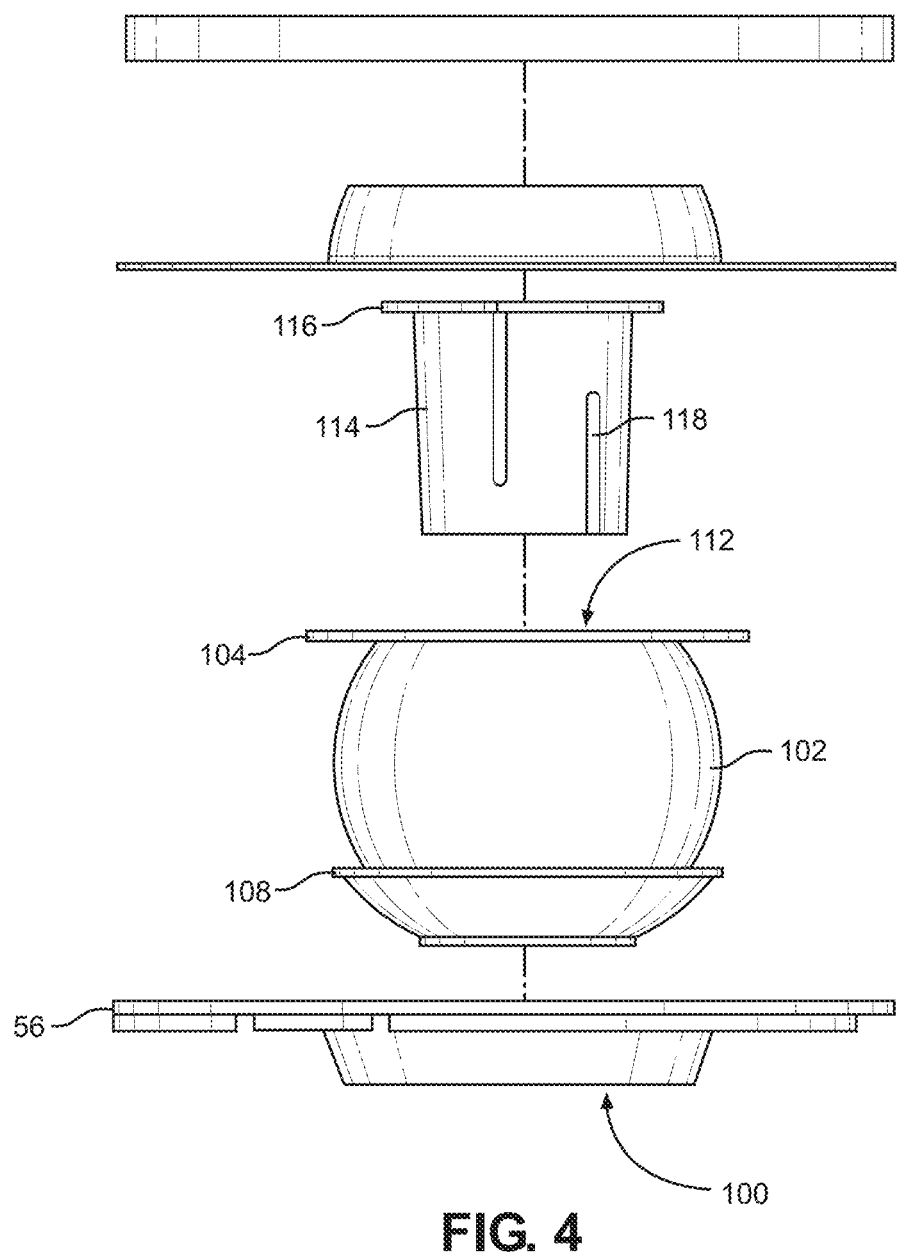
FIG. 4 shows a partially exploded view of a bearing, seal member, and flange according to a preferred embodiment of the present invention.
Figure 5:
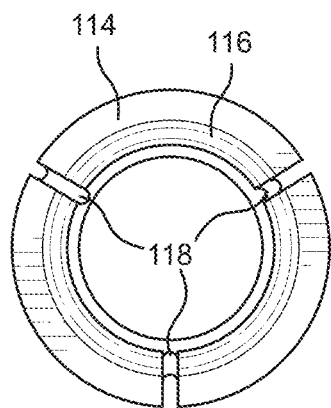
FIG. 5 shows a perspective view of a bearing according to a preferred embodiment of the present invention.
Figure 6:
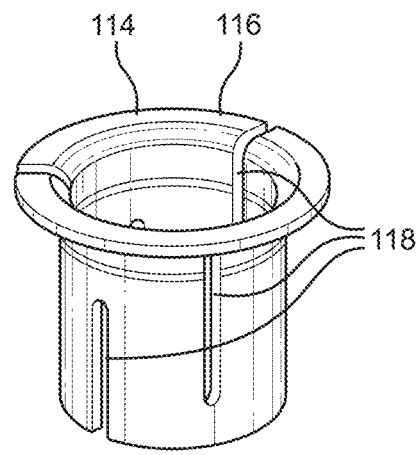
FIG. 6 shows a top view of a bearing according to a preferred embodiment of the present invention.
Figure 7:
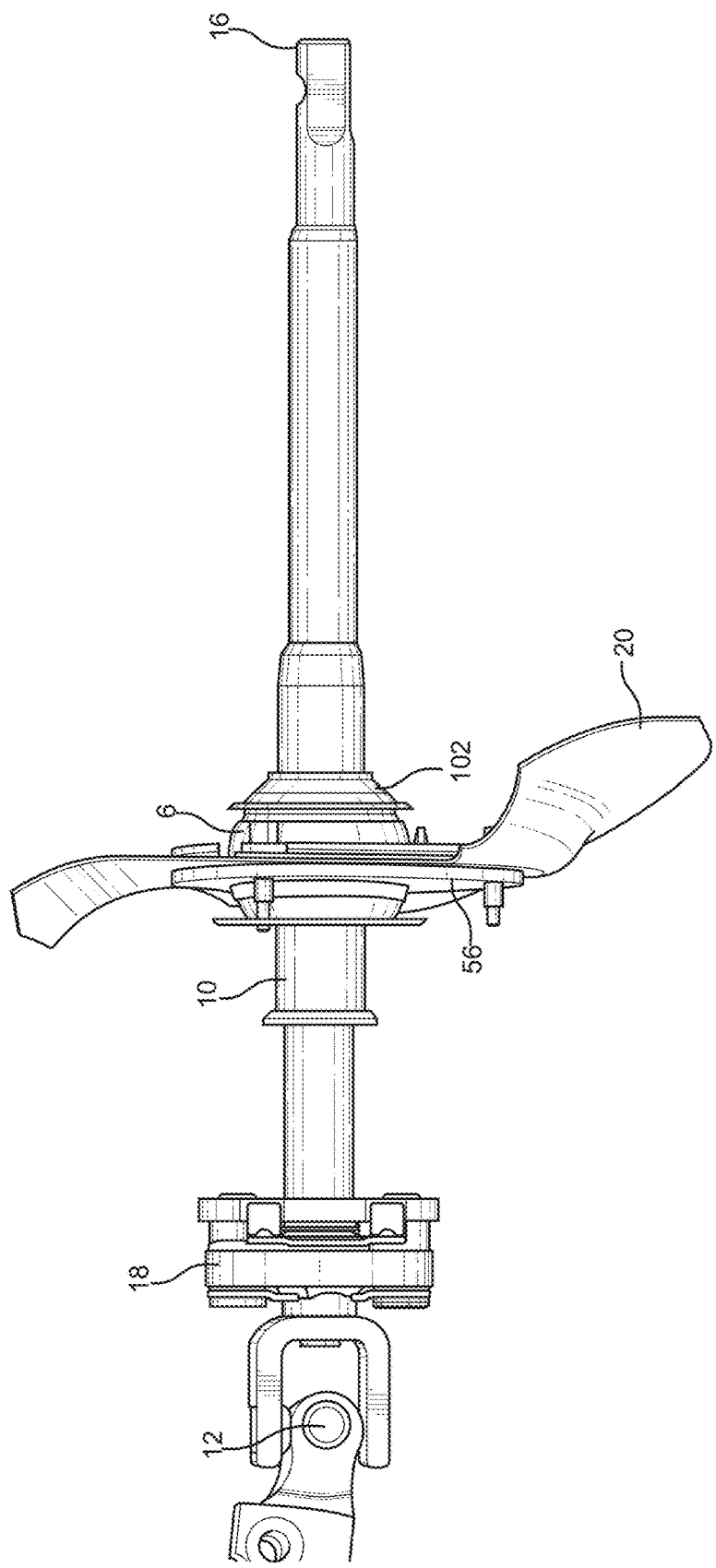
FIG. 7 shows a view of an embodiment of the present invention within the environment of an automobile.

As shown in FIG. 1, bearing and seal assembly 6 according to the present invention is intended to be employed with the intermediate shaft of an automotive steering system. In typical fashion, an intermediate shaft extends between a steering column and steering gear. The intermediate shaft is suspended at its upper end by upper U-joint 12 and at its lower end 16 by flexible coupling 18. The bearing and seal assembly 6 is mounted to a front of dash panel 20 of a vehicle.

A mounting flange 56 is attached to dash panel 20 by means of fasteners passing through mounting holes 66. The mounting holes 66 are configured and adapted to cooperate and correspond with preexisting connection points in the front of dash panel 20, as determined by the vehicle manufacturer. Mounting flange 56 is preferably molded of a plastic material such as nylon, polypropylene or other materials known to those skilled in the art or suggested by this disclosure. Other materials, such as metal or metal alloys, may be used within the scope and spirit of this invention.

The mounting flange 56 comprises a second cavity 100, which passes through the mounting flange 56 as shown. The second cavity 100 is preferably circular in profile. The second cavity 100 is adapted and located on the mounting flange 56 so that when the mounting flange 56 is connected to the front of dash panel 20, for example by affixing fasteners through the mounting holes 66 and the cooperative connection points in the front of dash panel, the second cavity 100 is cooperatively aligned with the intermediate shaft aperture in the front of dash panel 20. Further, the second cavity 100 preferably comprises a concave contact surface disposed around, or comprising, its inward-facing edge, which is adapted for sealed and at least partially rotatable engagement with convex outer surface of the seal member. Alternately, second cavity contact surface and seal member outer surface achieve sealed connection by use of a seal or gasket interposed between the second cavity contact surface and seal member outer surface.

The seal member 102 preferably comprises an elastomeric material, such as rubber or general purpose neoprene, but could be made of other materials known to those skilled in the art or suggested by this disclosure. The seal member 102 comprises an external profile substantially in the shape of an abbreviated sphere, with a first lip 104 at a first end and a second lip 108 at a second end. Each of the first lip 104 and second lip 108 comprise an outer diameter larger than the diameter of second cavity 100. The seal member 102 further comprises a centrally disposed first cavity 112 passing through it from first end to second end. First cavity 112 has a generally cylindrical inner profile and is adapted and shaped for engagement with the outer surface of bearing 114. Such engagement is preferably a substantially sealed engagement. Alternately, the inner surface of first cavity 112 and the outer surface of bearing 114 may achieve sealed engagement by use of a seal or gasket interposed between the inner surface of first cavity 112 and the outer surface of bearing 114.

The seal member 102 can be assembled into the mounting flange 56 by pressing seal member 102 into mounting flange 56 until first lip 104 or second lip 108 has been squeezed or compressed through second cavity 100. The convex outer surface of seal member 102 preferably mates with the contact surface of the mounting flange 56 for a substantially sealed and at least partially rotatable connection. First lip 104 and second lip 108 provide an interference fit to retain seal member 102 within mounting flange 56 during normal use.

The preferred complementary relationship between the convex and concave surfaces of seal member 102 and the contact surface, respectively, allows intermediate shaft 10 to assume any one of a plurality of alignment positions with respect to front of dash panel 20 because seal member 102 is adapted for at least partial rotation within mounting flange 56. This will allow a bearing and seal according to the present invention to accommodate minor angular misalignment of the intermediate shaft.

A bearing 114 according to embodiments of the present invention comprises a monolithic annular member comprised of an elastomer. Preferred materials include polypropylene and nylon-66, but other materials may be used as will be appreciated by one skilled in the art, such as polytetrafluoroethylene compounds such as Teflon® or copolyesters such as Hytrel®. The bearing 114 comprises a centrally disposed longitudinal channel with an inner diameter sized and adapted to accommodate the outer diameter of an intermediate shaft 10. The bearing 114 further comprises a plurality of partial discontinuities 118 disposed about its circumference. Each of these partial discontinuities 118 is preferably a longitudinal slit along a portion of the bearing wall, and each is at least partially offset longitudinally from adjacent discontinuities 118. The plurality of partial discontinuities 118 permit bearing 114 to flex radially so as to, within limits, increase the inner diameter of the bearing channel without compromising the overall hoop strength of the bearing 114. In this way, bearing 114 can, with reduced complexity and reduced cost of manufacture, achieve improved reliability compared to bearings known to the art, and can also accommodate irregularities or other slight variations in the diameter of intermediate shaft 10.

Bearing 114 is installed within the assembly by being fitted within second channel 100 through the opening of second channel 100 located at the first end. Bearing comprises a third lip 116, which engages the seal member first lip 104, creating a partial interference fit substantially retaining bearing 114 within seal member 102. Preferably, grease is applied to the inner surface of bearing 114 prior to installation of intermediate shaft 10 through the bearing channel.

As will be appreciated by one skilled in the art, a variety of additional components may be added to the assembly described in detail herein within the scope and spirit of the present invention. For example, intermediate or additional seals or gaskets, secondary flanges, or support members may all be added within the scope and spirit of the invention disclosed in various embodiments herein.

Other various modifications and variations will no doubt occur to those skilled in the art to which this invention pertains. All such variations which basically rely upon the teachings with which this disclosure has advanced the art are properly considered within the scope of this invention as defined by the appended claims.

What is claimed is:

1. A seal and bearing assembly for use in a vehicle firewall or front of dash panel, said assembly comprising:
   (a) a mounting flange, said mounting flange comprising a plurality of mounting holes and further comprising a second cavity passing through said mounting flange, said second cavity comprising a substantially annular contact surface;
(b) a seal member disposed within said second cavity, said seal member comprising a first lip located at a first end, a second lip located at a second end, a generally convex outer surface connecting said first lip and said second lip; said seal member further comprising a first opening within said first end, a second opening within said second end, and a first channel connecting said first opening to said second opening; and
(c) an annular bearing fitted within said first channel, said bearing comprising a plurality of partial discontinuities and a longitudinal third channel; wherein
(d) said outer surface of said seal member is in substantially sealed engagement with said contact surface, said seal member is retained within said second cavity by interference fit between said first lip, said second lip, and said mounting flange, and said bearing is disposed at least partially within said first channel and is further in substantially sealed engagement with said seal member.

2. The seal and bearing assembly of claim 1, wherein said bearing comprises a third lip.

3. The seal and bearing assembly of claim 2, wherein said third lip is substantially disposed against said first lip.

4. The seal and bearing assembly of claim 3, wherein said seal member and said bearing are each monolithic.

5. The seal and bearing assembly of claim 4, wherein said seal member is comprised of rubber.

6. The seal and bearing assembly of claim 5, wherein said bearing is comprised of at least one of polypropylene, nylon-66, a polytetrafluoroethylene, and a copolyester.

7. The seal and bearing assembly of claim 6, wherein said seal member is partially rotatably retained within said mounting flange.

8. The seal and bearing assembly of claim 7, wherein said bearing is radially flexible.

\* \* \* \* \*